No. 883,488. PATENTED MAR. 31, 1908.
T. SANDSTROM.
SHORT TURNING GEAR.
APPLICATION FILED AUG. 9, 1907.
3 SHEETS—SHEET 1.
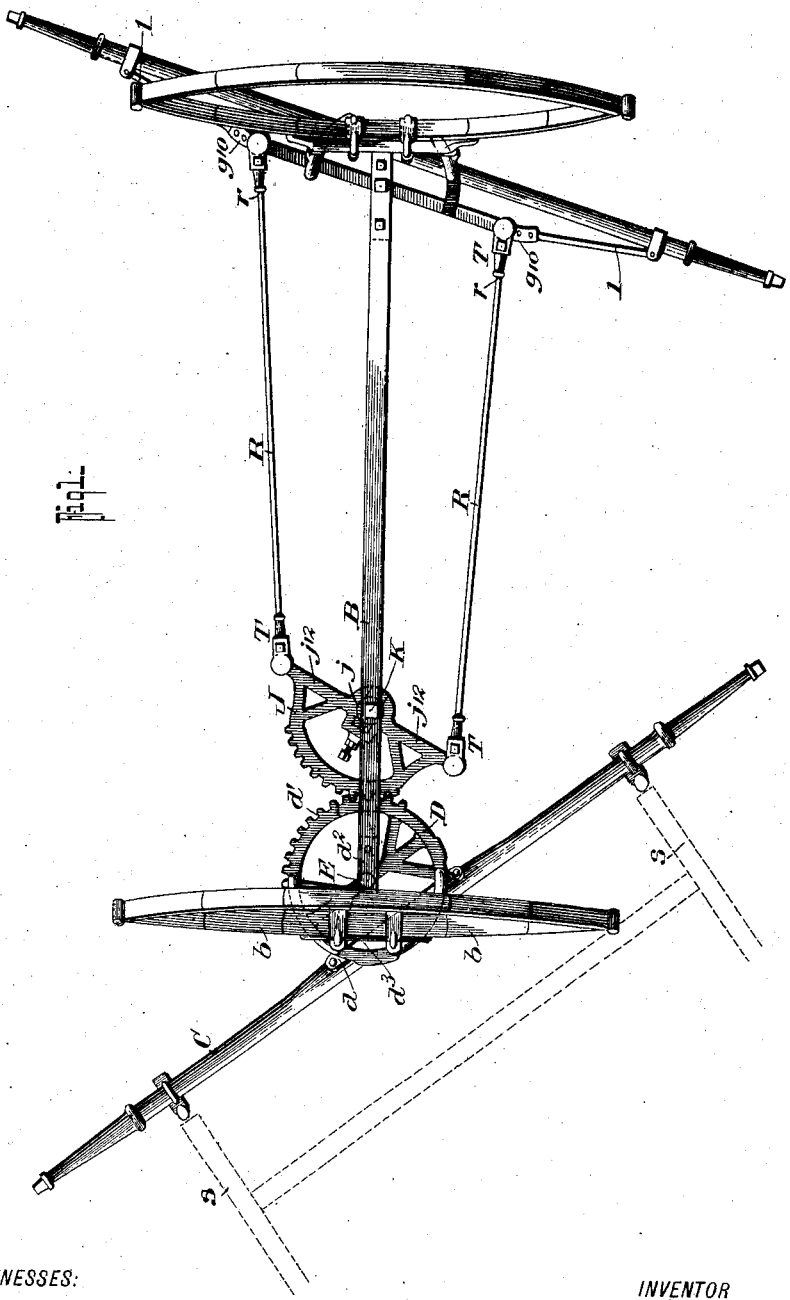
WITNESSES:
John T. Schrott
Hagaard Woodard
INVENTOR
Theodore Sandstrom
BY
Fred G. Dieterich & Co.
ATTORNEYS No. 883,488. PATENTED MAR. 31, 1908.
T. SANDSTROM.
SHORT TURNING GEAR.
APPLICATION FILED AUG. 9, 1907.
3 SHEETS—SHEET 2.
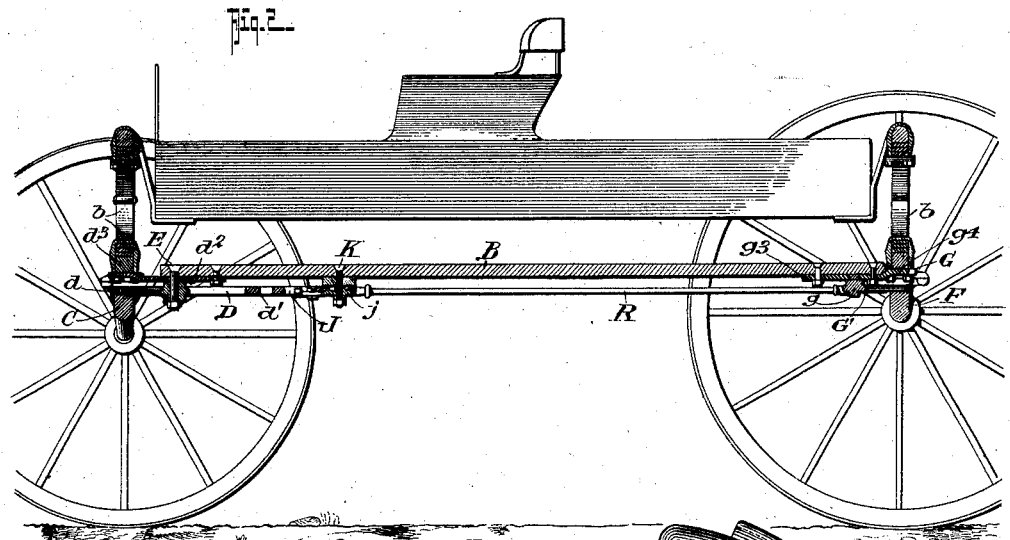
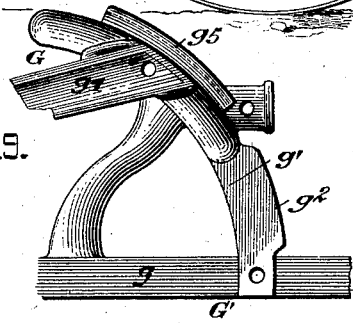
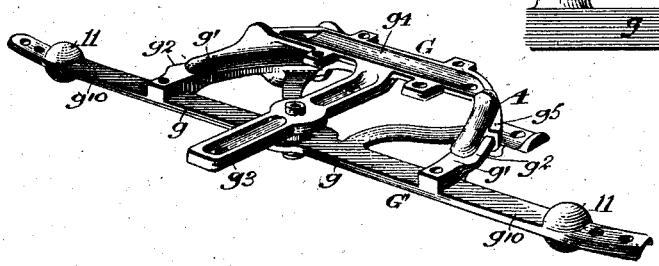
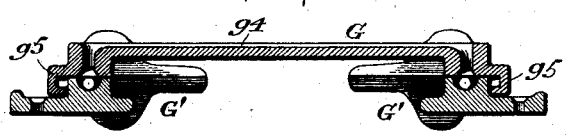
WITNESSES: INVENTOR
John T. Schrott Theodore Sandstrom.
Hayward Woodard BY
Fred G. Dieterich
ATTORNEYS

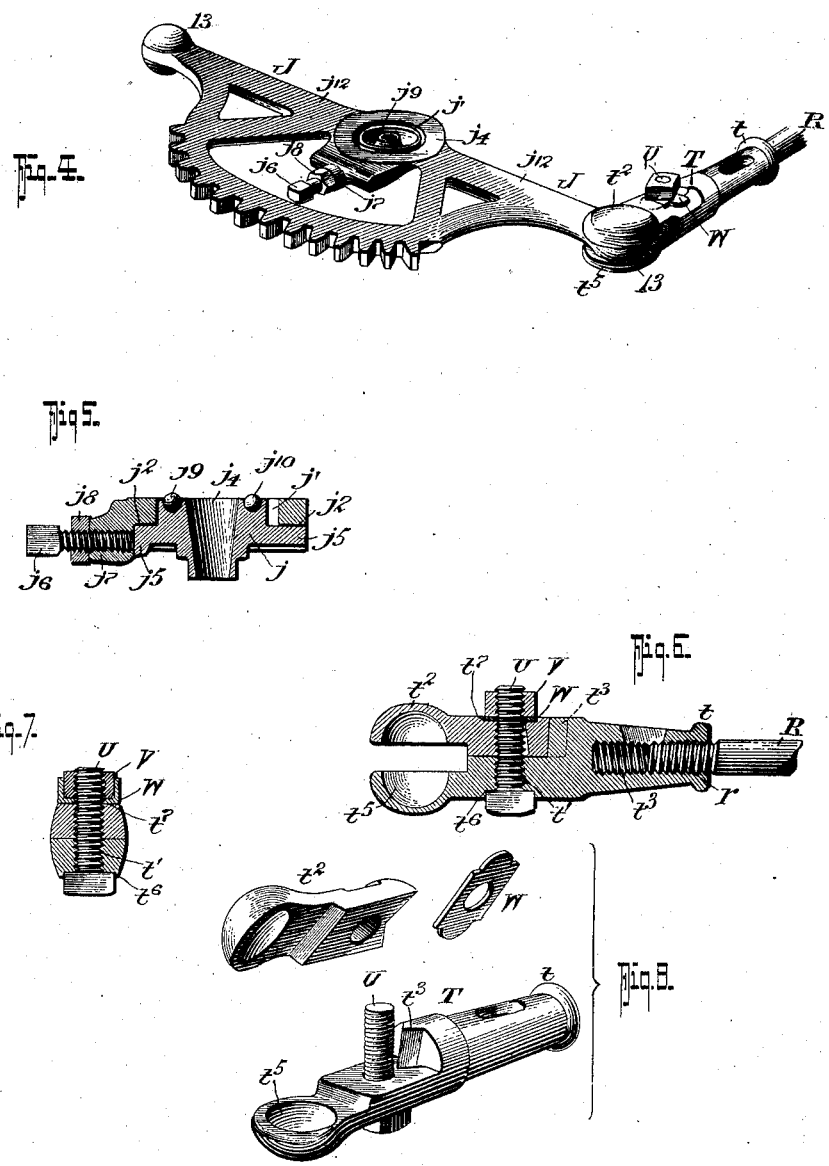

UNITED STATES PATENT OFFICE.

THEODORE SANDSTROM, OF INDIANAPOLIS, INDIANA.

SHORT-TURNING GEAR.

No. 883,488.  Specification of Letters Patent.  Patented March 31, 1908.

Application filed August 9, 1907. Serial No. 387,767.

*To all whom it may concern:*

Be it known that I, THEODORE SANDSTROM, residing at Indianapolis, in the county of Marion and State of Indiana, have invented a new and Improved Short-Turn Running-Gear, of which the following is a specification.

This invention relates to improvements in that form of wagon gearing, whose front and rear axles have fifth wheels combined therewith and which are joined by intermediate connections in such manner whereby a greater angle of movement of the axles within a shorter radius is attainable than is possible in the ordinary forms of axle bearings, whose king bolts or pivot connections are in the axial plane of the axles.

My present invention more specifically relates to improvements in that type of short turn wagon gearing mechanism disclosed in my Patent No. 728809, dated May 19, 1903 and it primarily comprehends a means for taking up the wear of the gear wheel connections that form a coöperative part of the fifth wheel device for the front axle.

My present invention also embodies an improved coöperative arrangement of the fifth wheel parts whereby they are structurally strengthened and whereby the several members are prevented from turning off or becoming disconnected when it is desired to make a complete turn of the front axle for convenience in getting on or off the vehicle.

Again, my present invention includes in its complete nature an improved means of coupling the connecting rod that joins the front and rear fifth wheel device.

It also includes in its more specific nature, certain details of construction and peculiar combination of parts, all of which will be hereinafter fully described, pointed out in the appended claims and illustrated in the accompanying drawings, in which:

Figure 1, is a perspective view, looking down on the complete construction of my present type of short turn gear. Fig. 2, is a longitudinal section thereof, showing it operatively combined with a wagon body and the axles. Fig. 3, is a perspective view of the rear fifth wheel device hereinafter specifically referred to. Fig. 4, is a perspective view of the supplemental fifth wheel member that has one of the coupling devices hereinafter referred to joined therewith. Fig. 5, is a longitudinal section of the adjusting means for taking up the wear of the gear members. Fig. 6, is a longitudinal section of one of the coupling members hereinafter referred to. Fig. 7, is a transverse section thereof, through the nut locking device. Fig. 8, is a detail view illustrating the several members of the coupling device separated. Fig. 9 is a plan view of a portion of the sixth wheel members and, Fig. 10 is a cross section of the said sixth wheel members.

In my present construction of short turn wagon gear, the general arrangement of the several parts is substantially like that disclosed in my patent before referred to.

Since the construction of the rear axle supporting irons is materially different in detail from that shown in my other patent, and further to distinguish the same from the front supporting frame, I term the rear irons the sixth wheel mechanism and the front irons the fifth wheel mechanism.

The front axle C to which the shafts $s$—$s$ are connected by the usual type of thill irons, is secured upon the under side of a cross bar $d$ that forms an integral part of the fifth wheel D which has a cog rim $d'$ for meshing with the supplemental gear faced fifth wheel J, presently again referred to.

The upper fifth wheel member also includes a rearwardly projected member $d^2$ that receives the front end of the reach bar B that is bolted to the said member $d^2$ as best shown in Fig. 2, which also clearly shows the king bolt E mounted on the reach bar, and in the member $d^2$ at a point to the rear of the axle C andupon this bolt E the fifth wheel D is fulcrumed to turn in the horizontal plane. The fifth wheel D has bearing members $d^3$ to receive the springs $b$—$b$ upon which the vehicle body may be mounted in any well-known manner. The supplemental fifth wheel J in my present construction of gearing is disposed in the horizontal plane of the wheel D and is fulcrumed on a bolt K that passes down through the adjustable axial bearing $j$ for the wheel J, the construction of which forms one of the essential features of my present invention.

By referring now more particularly to Figs. 4 and 5 it will be noticed that the wheel J is formed with a large axial opening $j'$ between oppositely and longitudinally disposed sockets $j^2$—$j^2$ that are formed on the under side of the wheel J for receiving a tubular hub $j^4$ that has oppositely projected flanges $j^5$ for fitting in the sockets $j^2$—$j^2$, the said hub being detachably mounted in the said opening $j'$ and the socket $j^2$ and held therein for longitudinal movement, the adjustment of which is provided for by a set screw $j^6$ mounted in the flange $j^7$ adjacent the front socket $j^2$ and held to bear against one end of the detachable hub, the said screw $j^6$ having a jam nut $j^8$ for holding it and the hub to the adjusted positions. The upper face of the hub $j^4$ is preferably formed with a ball race $j^9$ to receive the friction balls $j^{10}$ that ride against the under side of the reach bar.

By providing or adjusting the bearing for the king bolt on which the wheel J turns, a simple and easily handled means is provided for taking up the wear of the cog rims on the wheels J and D, thus rendering it easy for maintaining a proper fitting of the several parts that constitute the fifth wheel mechanism and for holding them from loose rattling.

The rear iron or sixth wheel mechanism comprises a bottom section G' composed of a cross member $g$, the ends of which are integral with the stationarily held segmental bearing members $g'$—$g'$, each provided with flanges $g^2$—$g^2$ see Figs. 3 and 9, for a purpose presently explained, and the said member $g$ is centrally apertured to receive the king bolt that also engages the projected arm $g^3$ to which the rear end of the reach bar B is bolted. The rear axle F is clipped on the under side of the sixth wheel mechanism in a manner clearly understood by reference to Figs. 1 and 2.

G designates the top section of the sixth wheel which comprises a cross bar $g^4$ having rearwardly projected segmental members 4 that ride upon the lower bearing member $g'$ and the said segmental members have circumferential ribs $g^5$—$g^5$ that ride on the flanges $g^2$—$g^2$, formed on the lower wheel section G', such connection of the upper and lower wheel sections serving to lock the said two wheel sections together in such manner that they cannot become separated in ordinary use, and also causing the rear axle to substantially relieve the strain on the king bolt upon which the upper wheel section is fulcrumed, as well as preventing the rattling usually incident in fifth wheel constructions. The upper sixth wheel section G is also formed with a forwardly projected member $g^3$ to which the rear end of the reach bar connects, see Fig. 2, by reference to which it will also be seen that the rear spring $b$ seats on and is fastened to the cross bar $g^4$ before referred to.

The outer ends of the cross member $g$ of the sixth wheel has extensions $g^{10}$—$g^{10}$, the extremities of which have apertured seats to which one end of the brace members 1—1 are secured and which have their other ends clipped to the outer end of the rear axle, as clearly shown in Fig. 1, by reference to which it will be seen that near their outer end the extensions $g^{10}$—$g^{10}$ have spherical or ball shaped bearing portions 11—11 and that the cross bar $j^{12}$ of the supplemental wheel $j$ that coacts with the fifth wheel mechanism is also formed with extensions provided with ball or spherical bearing surfaces 13—13. In my present form of wagon gearing, the connecting rods R—R are also parallelly arranged but have their ends adjustably connected with the fifth and sixth wheel mechanisms by ball and socket shackles, one for each end of each rod.

The shackles, designated T in the drawings, one of which is shown in detail in Fig. 8, each consists of an end portion $t$ having a threaded socket $t^3$ to receive the threaded ends $r$ of the rod R, the front portion having an aperture $t'$ and a semi-spherical cup end $t^5$ for engaging one side of the ball or spherical bearings 11 or 13 and which coöperates with an opposing cup shaped clamping member $t^2$ for fitting over the opposite side of the ball or portions 11 or 13.

The member $t^2$ which is detachably mounted on the opposing member of the shackle has a V-shaped notch at its inner end for fitting over the V-shaped lug $t^3$ on the member $t$, such lug and groove serving to hold the member $t^2$ from lateral displacement when the clamp bolt U is fitted through the aperture $t'$ in the part $t$ and through the registering aperture in the part $t^2$, the said bolt being pivotally held to its clamped position by reason of its head fitting the seat $t^6$ in the member $t$ and the transverse seat $t^7$ in the upper face of the member $t^2$. The bolt U is securely held by the nut V and the nut is held from wearing loose by the locking member in the nature of an apertured steel spring plate W that fits between the nut and the seat on the member $t^2$, as clearly shown in Fig. 6.

By reason of the construction and coöperative arrangement of the parts as described, the several parts have such adjustment that neither the front nor the rear wheels will "cramp" against the side of the vehicle when turning.

As disclosed in my present invention, all the parts are adjustably mounted and connected to such an extent that the least wear thereof can be easily taken up when desired.

By coupling the sixth wheel sections in the manner shown and described, all danger of the upper and lower sections opening or becoming disconnected when the axles are turned, in getting into or out of the vehicle is overcome.

It will be understood that the several parts that constitute my present invention are capable of being economically manufactured and for being readily assembled without the aids of more than the ordinary skill of a blacksmith or wheelwright, and furthermore, the parts are so connected and designed whereby to admit of using a high or low hung body, a wide or narrow body, the adjusting gears being correlatively so arranged that a short turn can be made with the rear wheel traveling as far out as the front wheel and adapted to clear any object that is cleared by the front wheels.

Having thus described my invention, what I claim and desire to secure by Letters Patent, is:—

1. A vehicle gearing of the character described, comprising in combination with the front and rear axles and the reach bar having means at the opposite ends for sustaining the vehicle body, a fifth wheel having a king bolt connection with the front end of the reach bar, and supporting the front axle, a sixth wheel having a king bolt connection with the rear end of the reach bar and supporting the rear axle, a supplemental fifth wheel disposed in the plane of the fifth wheel and having a direct gear connection therewith, and coupled with the sixth wheel, an adjustable king bolt connection that joins the supplemental wheel of the reach bar, for the purposes specified.

2. In a vehicle gearing of the character described, the combination of a reach bar, the front and rear axles, a fifth wheel on the front axle, a sixth wheel on the rear axle, an adjustable supplemental fifth wheel in direct gear connection with the other fifth wheel, king bolt connections for pivotally mounting the fifth and sixth wheels on the reach bar, and rod connections that join the supplemental fifth wheel with the sixth wheel, substantially as shown and described.

3. In a vehicle running gear of the character described, the combination with the front and rear axles, the fifth and sixth wheels mounted respectively on the said front and rear axles, the reach bar having means at the opposite ends for supporting the vehicle body, king bolt connections that pivotally join the fifth and sixth wheels with the reach bar; of a supplemental fifth wheel pivotally mounted on the reach bar, having direct gear connection with the front fifth wheel and having adjustment in the horizontal plane relatively to the said fifth wheel, and coupling devices that join with the supplemental fifth wheel at diametrically opposite points and with the sixth wheel, substantially as shown and described.

4. A vehicle gearing of the character described which comprises a fifth wheel mechanism and a sixth wheel mechanism, combined with means for transmitting motion from one mechanism to the other, the said means including a supplemental fifth wheel meshing with the fifth wheel mechanism and a journal bearing for the supplemental fifth wheel, adjustable in the longitudinal plane of the gearing.

5. In a vehicle gearing of the character described, the combination with the front axle, the rear axle, and the reach bar; of a fifth wheel mechanism fixedly connected with the front axle and pivotally mounted on the reach bar, the sixth wheel mechanism fixedly connected with the rear axle and pivotally mounted on the reach bar, and a supplemental fifth wheel mechanism that coöperates with the fifth and sixth wheel mechanisms for transmitting motion from one of the said mechanisms to the other, said fifth wheel mechanism being pivotally and adjustably mounted on the reach bar.

6. In a vehicle gearing of the character described, the combination with the fifth wheel mechanism, connected with the front axle, a sixth wheel mechanism connected with the rear axle, and means for transmitting motion from the fifth wheel mechanism to the sixth wheel mechanism, said means comprising a supplemental fifth wheel having a direct gear connection with the fifth wheel mechanism on the front axle and having a like connection with the sixth wheel mechanism on the rear axle, said supplemental fifth wheel being pivotally mounted and adjustable relatively to the fifth and sixth wheels, whereby to take up the wear, as set forth.

7. In a vehicle gearing of the character described, the combination with the front axle and the fifth wheel mechanism mounted thereon, said mechanism including a toothed faced circular rim, a reach bar, a king bolt connection for connecting the fifth wheel with the reach bar, a sixth wheel mounted on the rear axle, a king bolt that connects the sixth wheel with the reach bar, a supplemental fifth wheel having a geared rim that meshes with the geared rim of the fifth wheel on the front axle, said supplemental fifth wheel having an axial adjustable bearing, a king bolt that engages said bearing and a reach bar and coupling devices for connecting the supplemental fifth wheel with the sixth wheel mechanism, substantially as shown and described.

8. The combination, in a vehicle gearing of the character described, with the fifth and sixth wheel mechanisms, the fifth wheel mechanism including a segmental gear; of a supplemental fifth wheel comprising a supplemental gear that meshes with the other gear, said supplemental gear having a longitudinally adjustable apertured hub, a king bolt on the reach bar for engaging with the said adjustable hub, means mounted on the supplemental gear for adjusting the said hub and means for connecting the supplemental gear with the sixth wheel mechanism, substantially as shown and described.

9. In a vehicle gearing of the character described, in combination with the front axle and its fifth wheel mechanism, the rear axle and its sixth wheel mechanism, and means for transmitting motion from the fifth to the sixth wheel mechanisms, the said sixth wheel mechanism comprising the lower section fixedly mounted on the rear axle and having segmental horizontal portions provided with flanges, said lower section being adapted to be connected to the rear end of the reach bar, the upper section mounted on the reach bar, and including segmental portions rotatably slidable on the lower segmental members of the sixth wheel mechanism, said segmental portions having ribs for engaging and interlocking with the flanges on the lower segmental portions of the sixth wheel mechanism, and means for transmitting motion from the fifth to the sixth wheel mechanism, substantially as shown and described.

10. In a vehicle gearing of the character described, the combination with the front axle, the reach bar and the gear faced fifth wheel pivotally mounted on the reach bar, and secured to the axle, and a sixth wheel mechanism mounted on the rear axle and pivotally secured to the reach bar; of means for transmitting motion from the fifth to the sixth wheel mechanism, said means comprising a segmental gear that meshes with the gear face of the fifth wheel, said segmental gear having transverse extensions provided with spherical bearings, coupling members for joining the supplemental fifth wheel with the sixth wheel mechanism, said coupling members including a two part coupling head, each of which has a socket head for clamping over the spherical bearings on the supplemental fifth wheel, the two parts of said head having interlocking portions, the bolt and nut for clamping the portions of the head together, and a lock spring seated on the coupling head for engaging with the nut, all being arranged substantially as shown and described.

11. In a short turn vehicle gearing of the character described, the combination with the front and rear axles, the reach bar, the fifth and sixth wheel mechanism, each of said mechanisms comprising flanged seats for receiving the body supporting springs, a casting adapted to be secured to the reach bar and provided with a transverse member for holding the axle, and means for transmitting motion from the fifth wheel mechanism to the sixth wheel mechanism, said means including adjustable coupling members and adjustable means for taking up the wear between the several fifth and sixth wheels, substantially as shown and described.

THEODORE SANDSTROM.

Witnesses:
CHARLES J. SCHUH,
M. J. CRONER.